United States Patent
Onvlee

(10) Patent No.: US 7,630,118 B2
(45) Date of Patent: Dec. 8, 2009

(54) SPATIAL LIGHT MODULATOR, METHOD OF SPATIALLY MODULATING A RADIATION BEAM, LITHOGRAPHIC APPARATUS AND DEVICE MANUFACTURING METHOD

(75) Inventor: Johannes Onvlee, 's-Hertogenbosch (NL)

(73) Assignee: ASML Netherlands B.V., Veldhoven (NL)

( * ) Notice: Subject to any disclaimer, the term of this patent is extended or adjusted under 35 U.S.C. 154(b) by 579 days.

(21) Appl. No.: 10/868,191

(22) Filed: Jun. 16, 2004

(65) Prior Publication Data

US 2005/0007671 A1    Jan. 13, 2005

(30) Foreign Application Priority Data

Jun. 20, 2003    (EP) ................. 03253906

(51) Int. Cl.
*G02B 26/00* (2006.01)
(52) U.S. Cl. .............. 359/290; 359/292; 359/94; 359/291
(58) Field of Classification Search ........... 359/290
See application file for complete search history.

(56) References Cited

U.S. PATENT DOCUMENTS

| | | | |
|---|---|---|---|
| 4,941,735 A | 7/1990 | Moddel et al. ........... 350/342 |
| 5,229,872 A | 7/1993 | Mumola | |
| 5,296,891 A | 3/1994 | Vogt et al. | |
| 5,396,364 A | 3/1995 | O'Meara et al. ........... 359/292 |
| 5,500,736 A | 3/1996 | Koitabashi et al. | |
| 5,523,193 A | 6/1996 | Nelson | |
| 5,530,482 A | 6/1996 | Gove et al. | |
| 5,579,147 A | 11/1996 | Mori et al. | |
| 5,654,538 A | 8/1997 | Kane ................... 250/214 |
| 5,677,703 A | 10/1997 | Bhuva et al. | |
| 5,808,797 A | 9/1998 | Bloom et al. | |
| 5,982,553 A | 11/1999 | Bloom et al. | |
| 6,133,986 A | 10/2000 | Johnson | |
| 6,177,980 B1 | 1/2001 | Johnson | |
| 6,320,993 B1 * | 11/2001 | Laor ................... 385/16 |
| 6,445,488 B1 * | 9/2002 | Lee .................... 359/291 |
| 6,507,685 B1 * | 1/2003 | Polynkin et al. ......... 385/37 |
| 6,687,041 B1 | 2/2004 | Sandstrom | |
| 6,747,783 B1 | 6/2004 | Sandstrom | |
| 6,795,169 B2 | 9/2004 | Tanaka et al. | |
| 6,806,897 B2 | 10/2004 | Kataoka et al. | |
| 6,811,953 B2 | 11/2004 | Hatada et al. | |
| 6,831,768 B1 * | 12/2004 | Cebuhar et al. ......... 359/291 |

(Continued)

FOREIGN PATENT DOCUMENTS

JP    7-84196 A    3/1995

(Continued)

OTHER PUBLICATIONS

Translated Office Action, dated Jan. 25, 2007, for JP Patent Application No. 2004-180810, 4 pgs.

(Continued)

*Primary Examiner*—Jessica T Stultz
(74) *Attorney, Agent, or Firm*—Sterne, Kessler, Goldstein & Fox P.L.L.C.

(57) ABSTRACT

Each pixel of a spatial light modulator comprises a movable mirror, a light sensitive element and control circuitry to drive an actuator set the movable mirror to a state determined by a signal received by the light sensitive element.

37 Claims, 5 Drawing Sheets

U.S. PATENT DOCUMENTS

| | | | |
|---|---|---|---|
| 2002/0122237 A1* | 9/2002 | Sandstrom et al. | 359/291 |
| 2002/0153362 A1 | 10/2002 | Sandstrom et al. | 219/121.73 |
| 2003/0007523 A1* | 1/2003 | Chapman et al. | 372/20 |
| 2003/0123125 A1* | 7/2003 | Little | 359/290 |
| 2004/0041104 A1 | 3/2004 | Liebregts et al. | |
| 2004/0130561 A1 | 7/2004 | Jain | |
| 2005/0007572 A1 | 1/2005 | George et al. | |

FOREIGN PATENT DOCUMENTS

| | | |
|---|---|---|
| JP | 11-202226 A | 7/1999 |
| JP | 2003-5101 A | 1/2003 |
| JP | 2006-520920 A | 9/2006 |
| WO | WO 98/33096 | 7/1998 |
| WO | WO 98/38597 | 9/1998 |
| WO | WO 01/79935 A1 | 10/2001 |

OTHER PUBLICATIONS

European Search Report, EP 03 25 3906, Nov. 6, 2003, 9 pages.
Translation of Office Action, dated May 2, 2007, for Japanese Patent Application No. 2004-180810, 3 pgs.

* cited by examiner

SPATIAL LIGHT MODULATOR, METHOD OF SPATIALLY MODULATING A RADIATION BEAM, LITHOGRAPHIC APPARATUS AND DEVICE MANUFACTURING METHOD

BACKGROUND OF THE INVENTION

1. Field of the Invention

The present invention relates to a spatial light modulator and a method of spatially modulating a radiation beam such as may be used in lithographic projection apparatus and device manufacturing methods.

2. Related Art

A lithographic apparatus is a machine that applies a desired pattern onto a target portion of a substrate. Lithographic apparatus can be used, for example, in the manufacture of integrated circuits (ICs), flat panel displays and other devices involving fine structures. In a conventional lithographic apparatus, a patterning means, which is alternatively referred to as a mask or a reticle, may be used to generate a circuit pattern corresponding to an individual layer of the IC (or other device), and this pattern can be imaged onto a target portion (e.g., comprising part of one or several dies) on a substrate (e.g., a silicon wafer or glass plate) that has a layer of radiation-sensitive material (resist). Instead of a mask, the patterning means may comprise an array of individually controllable elements that generate the circuit pattern on an impinging light beam.

In general, a single substrate will contain a network of adjacent target portions that are successively exposed. Lithographic apparatus include steppers, in which each target portion is irradiated by exposing an entire pattern onto the target portion in one pass, and scanners, in which each target portion is irradiated by scanning the pattern through the projection beam in a given direction (the "scanning"-direction), while synchronously scanning the substrate parallel or anti-parallel to this direction.

A significant problem in a lithographic apparatus using a programmable patterning means is uploading the data necessary to set the pixels of the programmable patterning means. To achieve throughputs and resolutions comparable with mask-based lithographic apparatus requires data transfer rates of 80 terabits per second or more. A typical programmable patterning means may have pixels of about 8 µm×8 µm and about 1000×4000 pixels. Multiple communication lines need to be operated in parallel to achieve the data rate required. Switching rates will be high and thus there is a large heat dissipation in a small device. Also, the necessary addressing circuitry is complex and difficult to fit in a small space.

Therefore, what is needed is a spatial light modulator to which pattern data can be uploaded without requiring complex addressing circuitry and with reduced heat dissipation.

SUMMARY OF THE INVENTION

One embodiment of the present invention provides a spatial light modulator comprising an array of pixels disposed on a substrate. Each pixel comprises a movable mirror that is movable between at least two positions in which an incident radiation beam of a first wavelength is reflected into respectively different return paths, an actuator arranged to move the movable mirror between positions, a light sensitive element to receive a programming beam of a second wavelength and generate a control signal in response thereto, and control circuitry to control the actuator to set the movable mirror to a selected position according to the control signal generated by the light sensitive element.

The light sensitive element provided for each pixel of the spatial light modulator allows the pattern data to be uploaded optically rather than electronically, avoiding the need to provide complex addressing circuitry and reducing the heat dissipation in the spatial light modulator. A programming beam can be modulated at the required data transfer rates using known techniques and without dissipating substantial amounts of heat at the spatial light modulator.

In one example, the movable mirror and light sensitive element of each pixel are disposed on the same side of the substrate. This simplifies manufacture of the spatial light modulator and enables it to be made with conventional manufacturing techniques, e.g. lithography. In such an example, the movable mirror can be disposed over the light sensitive element and arranged to be substantially transparent to radiation of the second wavelength so that the pixels can be programmed through the light modulating elements.

In another example, the substrate can be chosen to be substantially transparent to radiation of the second wavelength. For example, the light modulating element and/or the substrate can be made of silicon and the programming beam may be of infra-red radiation. Then, the device can be projected from the backside, through the substrate.

In another example, the movable mirror and light sensitive element of each pixel are disposed on opposite sides of the substrate. Such an arrangement enables the light sensitive element to be larger in size and also makes it easier to direct the programming beam onto the array since the optical arrangements for doing that are not constrained by the need not to obscure the radiation beam.

In one example, the spatial light modulator further comprises beam scanning means for scanning at least one programming beam across the array of pixels. Where the array of pixels is a two dimensional array having a plurality of rows and a plurality of columns the beam scanning means can be adapted to scan a plurality of programming beams equal in number to the plurality of columns along respective ones of the columns. In this way a whole row of pixels can be programmed in parallel, massively reducing the time taken to program the array.

The beam scanning means can comprise a prism having reflective surfaces and disposed with its axis perpendicular to the columns and means for rotating the prism about the axis The rotation of such a prism can be synchronized to the pulses of the projection beam and to the data-modulated programming beams.

The light sensitive element in one example comprises a photodiode and the actuator comprises a capacitor connected to the photodiode so as to be charged by current generated in the photodiode by the programming beam when incident thereon. This provides a simple arrangement that can easily be accommodated in the substrate around the modulating element. The intensity and size of the programming beam and the duration for which it is incident on the light sensitive element can therefore be used to control the amount of charge accumulated by the capacitor and hence the position adopted by the movable mirror. An amplifier for amplifying the current generated in the photodiode can be provided to allow rapid programming without a high intensity programming beam.

The movable mirror in a one embodiment of the invention is one that can pivot between two or more, or a continuum, of positions under the control of the actuator, so that the modulated beam is divided into different paths according to the state of the mirror. A mirror displaceable along its normal may also be used to effect a plane modulation of the modulated beam.

Another embodiment of the present invention provides a method of spatially modulating a radiation beam according to a pattern using a spatial light modulator comprising an array of pixels disposed on a substrate Each pixel comprises a movable mirror that is movable between at least two positions in which an incident radiation beam of a first wavelength is reflected into respectively different return paths, an actuator arranged to move the movable mirror between positions, a light sensitive element to receive a programming beam of a second wavelength and generate a control signal in response thereto, and control circuitry to control the actuator to set the movable mirror to a selected position according to the control signal generated by the light sensitive element.

In this embodiment, the method comprising the steps of modulating at least one programming beam according to the pattern, scanning the or each programming beam across the array in synchronism with the modulation of the or each beam so as to irradiate each light sensitive element and thereby set the state of the corresponding movable mirror, and directing a radiation beam onto the spatial light modulator so as to be modulated according to the states of the movable mirror.

In one example, the radiation beam is pulsed, in which case the steps of modulating and scanning are carried out between pulses of the radiation beam.

A further embodiment of the present invention provides a lithographic projection apparatus comprising an illumination system for providing a projection beam of radiation, programmable patterning means for patterning the projection beam according to a desired pattern, a substrate table for holding a substrate, a projection system for projecting the patterned beam onto a target portion of the substrate. The programmable patterning means comprises a spatial light modulator as described above.

A still further embodiment of the present invention provides a device manufacturing method comprising the steps of providing a substrate, providing a projection beam of radiation using an illumination system, patterning the projection beam using a method as described above, and projecting the patterned beam of radiation onto a target portion of the substrate.

Further embodiments, features, and advantages of the present invention, as well as the structure and operation of the various embodiments of the present invention are described in detail below with reference to accompanying drawings.

BRIEF DESCRIPTION OF THE FIGURES

The accompanying drawings, which are incorporated herein and form a part of the specification, illustrate various embodiments of the present invention and, together with the description, further serve to explain the principles of the invention and enable a person skilled in the pertinent art to make and use the invention.

In the Figures, corresponding reference symbols indicate corresponding parts.

DETAILED DESCRIPTION OF THE DETAILED EMBODIMENT(S)

Terminology

Figure 1:
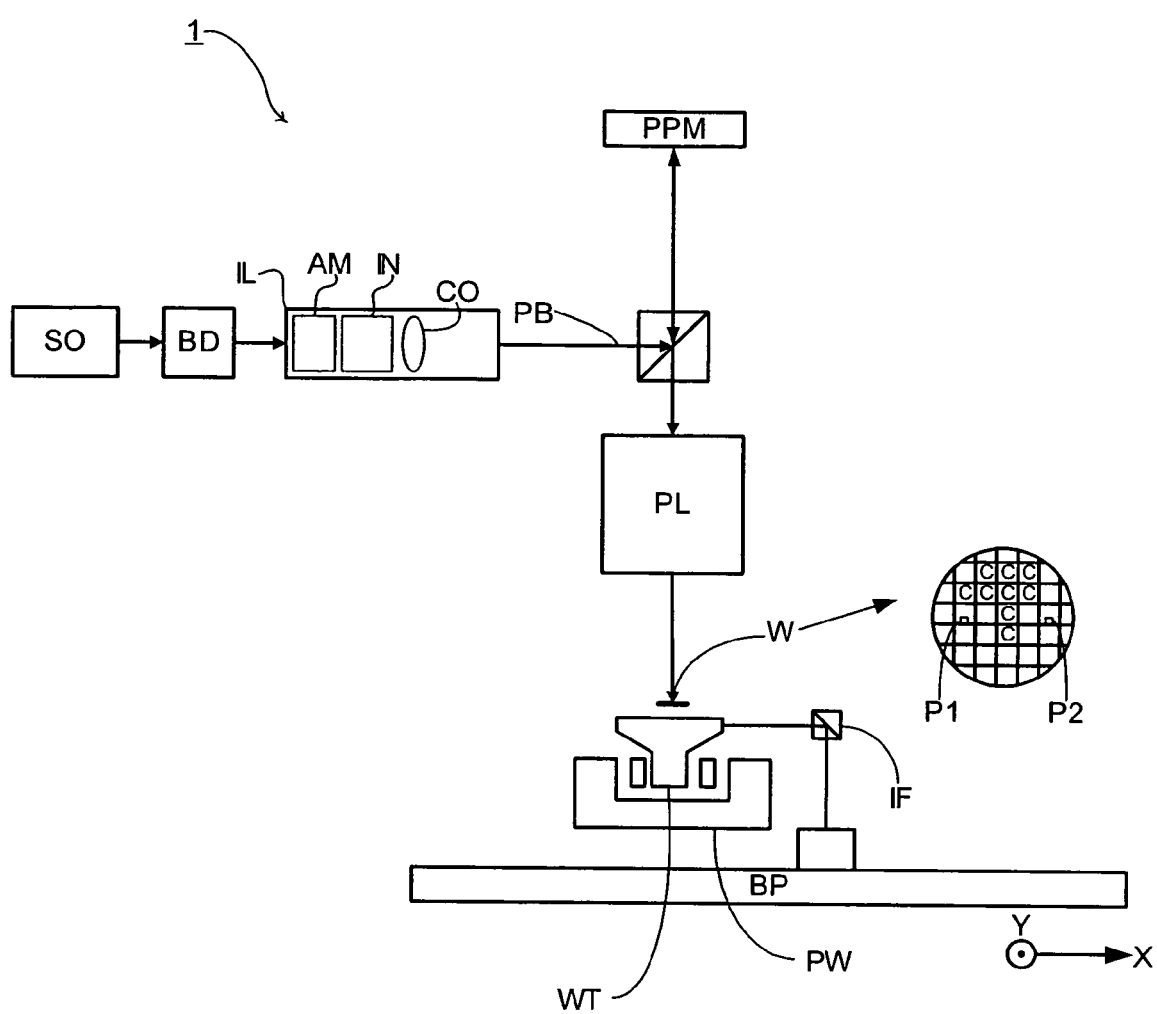
FIG. 1 depicts a lithographic projection apparatus, according to one embodiment of the invention.

The term "array of individually controllable elements" as here employed should be broadly interpreted as referring to any means that can be used to endow an incoming radiation beam with a patterned cross-section, so that a desired pattern can be created in a target portion of the substrate; the terms "light valve" and "Spatial Light Modulator" (SLM) can also be used in this context. Examples of such patterning means include, but are not limited to, a programmable mirror array and a programmable liquid crystal device (LCD) array.

A programmable mirror array may comprise a matrix-addressable surface having a viscoelastic (i.e., having viscous as well as elastic properties) control layer and a reflective surface. The basic principle behind such an apparatus is that addressed areas of the reflective surface reflect incident light as diffracted light, whereas unaddressed areas reflect incident light as undiffracted light. Using an appropriate spatial filter, the undiffracted light can be filtered out of the reflected beam, leaving only the diffracted light to reach the substrate. In this manner, the beam becomes patterned according to the addressing pattern of the matrix-addressable surface.

It will be appreciated that, as an alternative, the filter may filter out the diffracted light, leaving the undiffracted light to reach the substrate.

An array of diffractive optical MEMS devices can also be used in a corresponding manner. Each diffractive optical MEMS device is comprised of a plurality of reflective ribbons that can be deformed relative to one another to form a grating that reflects incident light as diffracted light.

A further alternative embodiment of a programmable mirror array employs a matrix arrangement of tiny mirrors, each of which can be individually tilted about an axis by applying a suitable localized electric field, or by employing piezoelectric actuation means. Once again, the mirrors are matrix-addressable, such that addressed mirrors will reflect an incoming radiation beam in a different direction to unaddressed mirrors. In this manner, the reflected beam is patterned according to the addressing pattern of the matrix-addressable mirrors.

The matrix addressing can be performed using suitable electronic means. In the examples described above, the array of individually controllable elements can comprise one or more programmable mirror arrays. More information on mirror arrays can be found, for example, from U.S. Pat. Nos. 5,296,891 and 5,523,193, and PCT patent applications WO 98/38597 and WO 98/33096, which are incorporated herein by reference.

An example programmable LCD array is shown in U.S. Pat. No. 5,229,872, which is incorporated herein by reference.

It should be appreciated that where pre-biasing of features, optical proximity correction features, phase variation techniques, and multiple exposure techniques are used, for example, the pattern "displayed" on the array of individually controllable elements may differ substantially from the pattern eventually transferred to a layer of or on the substrate. Similarly, the pattern eventually generated on the substrate may not correspond to the pattern formed at any one instant on the array of individually controllable elements. This may be the case in an arrangement in which the eventual pattern formed on each part of the substrate is built up over a given period of time or a given number of exposures, during which the pattern on the array of individually controllable elements and/or the relative position of the substrate changes.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat panel displays, thin-film magnetic heads, etc. The skilled artisan will appreciate that, in the context of such alternative applications, any use of the terms "wafer" or "die" herein may be considered as synonymous with the more general terms "substrate" or "target portion," respectively.

The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including, but not necessarily limited to, ultraviolet (UV) radiation (e.g. having a wavelength of 408, 355, 365, 248, 193, 157 or 126 nm) and extreme ultra-violet (EUV) radiation (e.g. having a wavelength in the range of 5-20 nm), as well as particle beams, such as ion beams or electron beams.

The term "projection system" used herein should be broadly interpreted as encompassing various types of projection systems, including refractive optical systems, reflective optical systems, and catadioptric optical systems, as appropriate for example for the exposure radiation being used, or for other factors such as the use of an immersion fluid or the use of a vacuum. Any use of the term "lens" herein may be considered as synonymous with the more general term "projection system."

The illumination system may also encompass various types of optical components, including refractive, reflective, and catadioptric optical components for directing, shaping, or controlling the projection beam of radiation, and such components may also be referred to below, collectively or singularly, as a "lens".

The lithographic apparatus may be of a type having two (dual stage) or more substrate tables. In such "multiple stage" machines the additional tables may be used in parallel, or preparatory steps may be carried out on one or more tables while one or more other tables are being used for exposure.

The lithographic apparatus may also be of a type wherein the substrate is immersed in a liquid having a relatively high refractive index, e.g. water, so as to fill a space between the final element of the projection system and the substrate. Immersion liquids may also be applied to other spaces in the lithographic apparatus, for example, between the array of individually controllable elements and the first element of the projection system. Immersion techniques are well known in the art for increasing the numerical aperture of projection systems.

Exemplary Environment

FIG. 1 schematically depicts a lithographic projection apparatus, according to one embodiment of the invention. The apparatus comprises an illumination system (illuminator) IL, an array of individually controllable elements PPM, a substrate table WT for supporting a substrate W, and a projection system ("lens") PL.

Illumination system (illuminator) IL provides a projection beam PB of radiation (e.g. UV radiation).

The array of individually controllable elements PPM (e.g., a programmable mirror array) patterns the projection beam. In one example, the position of the array of individually controllable elements will be fixed relative to projection system PL. In another example, it may instead be connected to a positioning means for accurately positioning it with respect to projection system PL.

As discussed above, the substrate table WT (e.g., a wafer table) supports the substrate W (e.g. a resist-coated wafer). The substrate table WT is also connected to a positioning means PW for accurately positioning the substrate with respect to projection system PL.

The projection system ("lens") PL images a pattern imparted to the projection beam PB by the array of individually controllable elements PPM onto a target portion C (e.g., comprising one or more dies) of the substrate W. In one example, the projection system PL may image the array of individually controllable elements PPM onto the substrate W. In anther example, the projection system PL may image secondary sources, for which the elements of the array of individually controllable elements PPM act as shutters. The projection system PL may also comprise an array of focusing elements, such as a micro lens array (known as an MLA) or a Fresnel lens array. This can be done, for example, to form the secondary sources and to image microspots onto the substrate.

In the embodiment shown, the apparatus is of a reflective type (i.e., has a reflective array of individually controllable elements). However, in general, it may also be of a transmissive type, e.g., with a transmissive array of individually controllable elements.

The illuminator IL receives a beam of radiation from a radiation source SO. In one example, the source SO and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD. In this case the beam delivery system BD includes, but is not limited to, suitable directing mirrors and/or a beam expander. In other examples the source SO may be integral part of the apparatus, for example when the source is a mercury lamp. In this example, the source SO and the illuminator IL, together with the beam delivery system BD, if required, may be referred to as a radiation system.

The illuminator IL may comprise adjusting means AM for adjusting the angular intensity distribution of the beam. Generally, at least the outer and/or inner radial extent (commonly referred to as σ-outer and σ-inner, respectively) of the intensity distribution in a pupil plane of the illuminator IL can be adjusted. In some examples the illuminator IL comprises various other components, such as an integrator IN and a condenser CO. The illuminator IL provides a conditioned beam of radiation, referred to as the projection beam PB, having a desired uniformity and intensity distribution in its cross-section.

The beam PB subsequently interacts with the array of individually controllable elements PPM. Having been reflected by the array of individually controllable elements PPM, the beam PB passes through the projection system PL, which focuses the beam PB onto a target portion C of the substrate W.

In one example, with the aid of a positioning means PW, and possibly an interferometric measuring means IF, the substrate table WT can be moved accurately, e.g., so as to position different target portions C in the path of the beam PB.

In one example, a positioning means PW for the array of individually controllable elements PPM can be used to accurately correct the position of the array of individually controllable elements PPM with respect to the path of the beam PB, e.g. during a scan.

In one example, movement of the substrate table WT is realized with the aid of a long-stroke module (course positioning) and a short-stroke module (fine positioning), which are not explicitly depicted in FIG. 1. A similar system may also be used to position the array of individually controllable elements PPM.

It will be appreciated that the projection beam PB may alternatively/additionally be moveable while the substrate table WT and/or the array of individually controllable elements PPM may have a fixed position to provide the required relative movement.

As a further alternative, that may be especially applicable in the manufacture of flat panel displays, the position of the substrate table WT and the projection system PL may be fixed and the substrate W may be arranged to be moved relative to the substrate table WT. For example, the substrate table WT may be provided with a system for scanning the substrate W across it at a substantially constant velocity.

Although the lithography apparatus according to the invention is herein described as being for exposing a resist on a substrate, it will be appreciated that the invention is not limited to this use and the apparatus may be used to project a patterned projection beam for use in resistless lithography.

The depicted apparatus can be used in four one modes: a step mode, a scan mode, a pulse mode, and a continuous scan mode.

In a step mode, the array of individually controllable elements PPM imparts an entire pattern to the projection beam PB, which is projected onto a target portion C in one pass (i.e., a single static exposure). The substrate table WT is then shifted in the X and/or Y direction, so that a different target portion C can be exposed. In step mode, the maximum size of the exposure field limits the size of the target portion C imaged in a single static exposure.

In Scan mode, the array of individually controllable elements PPM is movable in a given direction (e.g., a "scan direction" or a Y direction) with a speed v, so that the projection beam PB is caused to scan over the array of individually controllable elements PPM. Concurrently, the substrate table WT is substantially simultaneously moved in the same or opposite direction at a speed V=Mv, in which M is the magnification of the lens PL. In scan mode, the maximum size of the exposure field limits the width (in the non-scanning direction) of the target portion C in a single dynamic exposure, whereas the length of the scanning motion determines the height (in the scanning direction) of the target portion C.

In Pulse mode, the array of individually controllable elements PPM is kept essentially stationary and the entire pattern is projected onto a target portion C of the substrate W using a pulsed radiation system. The substrate table WT is moved with an essentially constant speed, such that the projection beam PB is caused to scan a line across the substrate W. The pattern on the array of individually controllable elements PPM is updated as required between pulses of the radiation system. The pulses are timed such that successive target portions C are exposed at the required locations on the substrate W. Consequently, the projection beam PB scans across the substrate W to expose the complete pattern for a strip of the substrate W. The process is repeated until the complete substrate W has been exposed line by line.

Continuous scan mode is essentially the same as pulse mode except that a substantially constant radiation source is used and the pattern on the array of individually controllable elements PM is updated as the projection beam PB scans across the substrate W and exposes it.

Combinations and/or variations on the above described modes of use or entirely different modes of use may also be employed.

Exemplary Spatial Light Modulator and Operation of Same

Figure 2:
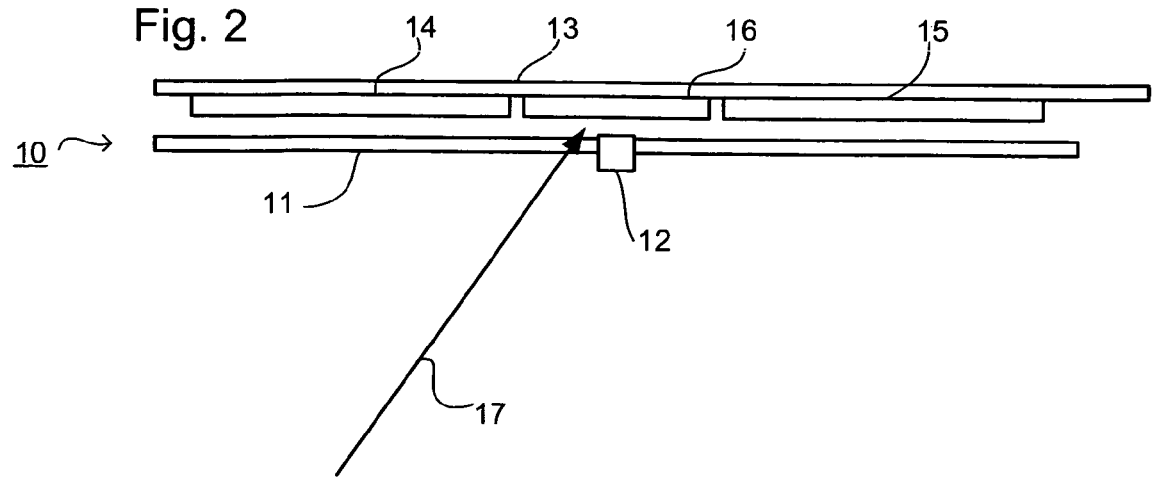
FIG. 2 depicts an element of a spatial light modulator, according to one embodiment of the invention during a programming phase.

FIG. 2 depicts an element of a spatial light modulator, according to one embodiment of the invention during a programming phase. FIG. 2 shows in cross-section an element 10 (e.g., pixel) of programmable patterning means (PPM) (e.g., spatial light modulator (SLM)). Each element 10 comprises a mirror 11 pivotable about axle 12, which forms a beam modulating element of element 10, mounted above a substrate 13. Supports for axle 12 are omitted from the view for clarity. To control the pivoting of mirror 11, capacitor plates 14, 15 are provided on substrate 13, one under each half of mirror 11. Corresponding plates (not shown) are provided on a back of mirror 11, although these may be omitted if mirror 11 itself is sufficiently conductive.

Figure 3:
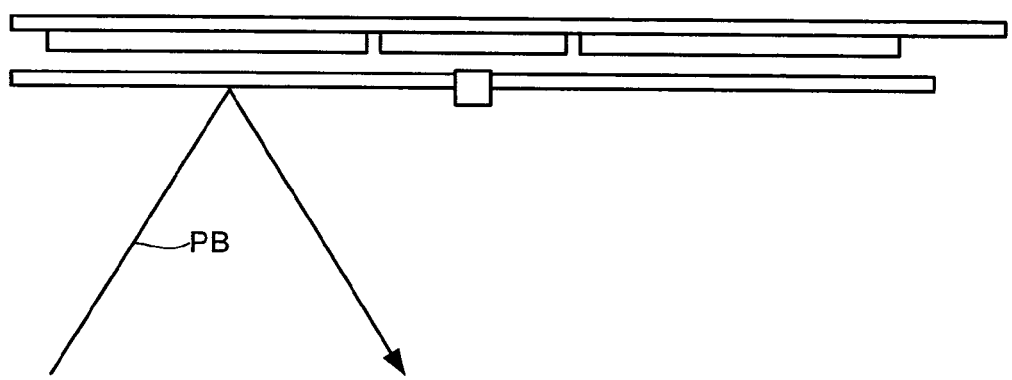
FIGS. 3 and 4 depict an element of a spatial light modulator, according to one embodiment of the present invention during an exposure phase with a deformable mirror in rest and activated positions.
Figure 4:
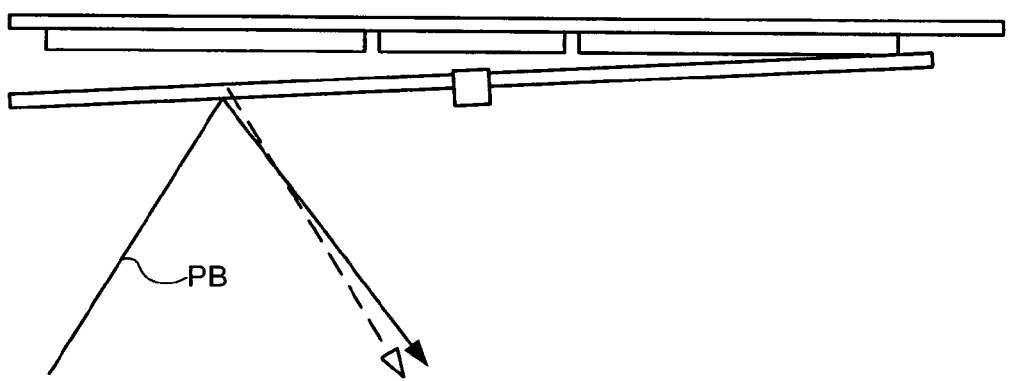

FIGS. 3 and 4 depict an element of a spatial light modulator, according to one embodiment of the present invention during an exposure phase with a deformable mirror in rest and activated positions. FIGS. 3 and 4 show element 10 in rest and activated positions showing that incident projection beam PB is reflected in different directions during a rest state and an activated state of mirrors 11. In one example. a suitable spatial filter is used to block radiation reflected by mirrors 11 in one of these two states, so that mirror 11 becomes a switch. More complex arrangements can be used to affect grayscales.

In one example, programming element 10 is performed by selectively irradiating a light sensitive element 16 (e.g., a photodiode) with a programming beam 17, which has a wavelength to which mirror 11 is transparent. In one example in which mirror 11 is made of silicon, an infra-red programming beam 17 is used. This is because silicon is transparent to infra-red radiation, while reflective to a "blue" projection beam (e.g., about 365 nm or less).

In examples using coatings on mirror 11 to improve reflectivity for projection beam PB and any conductive layers to form capacitor plates 14,15, the coatings are also arranged to be transparent to infra-red radiation. Alternatively, the conductive layers may be provided in the form of grids.

Figure 5:
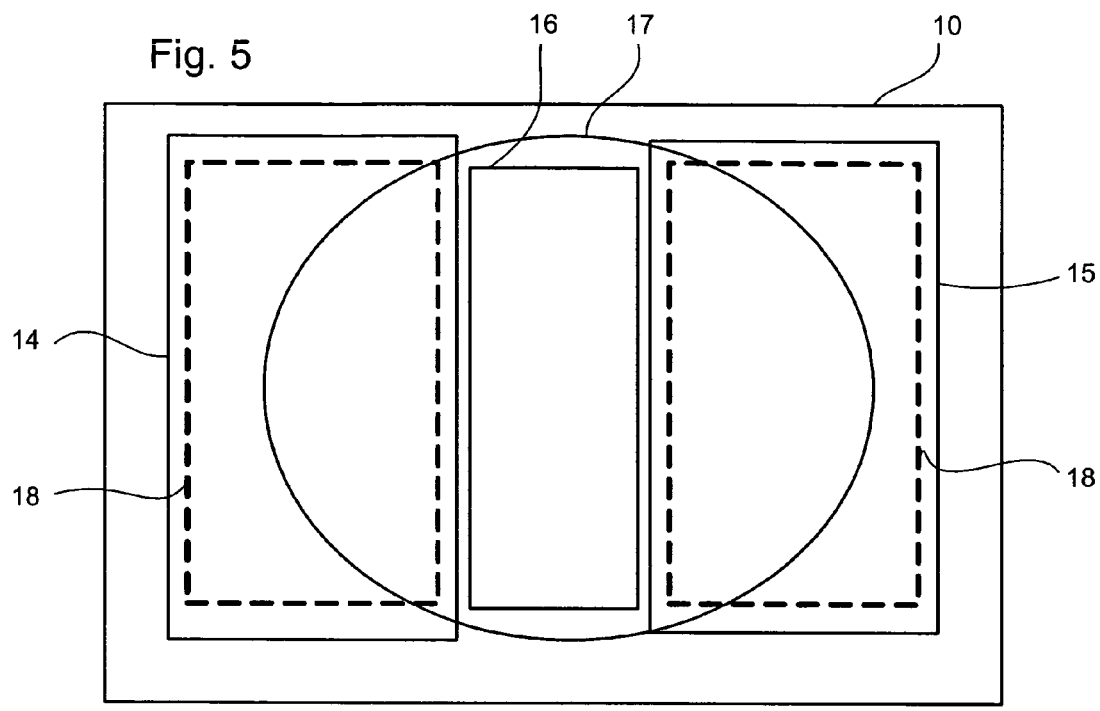
FIG. 5 is a plan view of an element of a spatial light modulator, according to one embodiment of the present invention.

FIG. 5 is a plan view of an element of a spatial light modulator, according to one embodiment of the present invention. In the embodiment shown in FIG. 5, which is a plan view of element 10, photodiode 16 is positioned in a space between capacitor plates 14, 15. If element 10 is programmed in a short pulse of programming beam 17, a footprint of programming beam 17 is made larger than photodiode 16, so that an error in positioning of programming beam 17 does not affect an amount of charge developed in photodiode 16.

Alternatively, grayscale programming can be achieved using a smaller programming beam 17, which is scanned along a length of photodiode 16. In one example, a length of time programming beam 17 is ON determines a charge generated in photodiode 16, and hence a grayscale value. In this example, a footprint of programming beam 17 is rectangular, so that any lateral misplacement of programming beam 17 does not affect the amount of charge generated in photodiode 16.

In one example, control circuitry 18 is used to amplify the charge signal generated in photodiode 16 and apply it to capacitor plates 14, 15 is located in substrate 13 below capacitor plates 14, 15. Control circuitry 18 is described further below.

Figure 6:
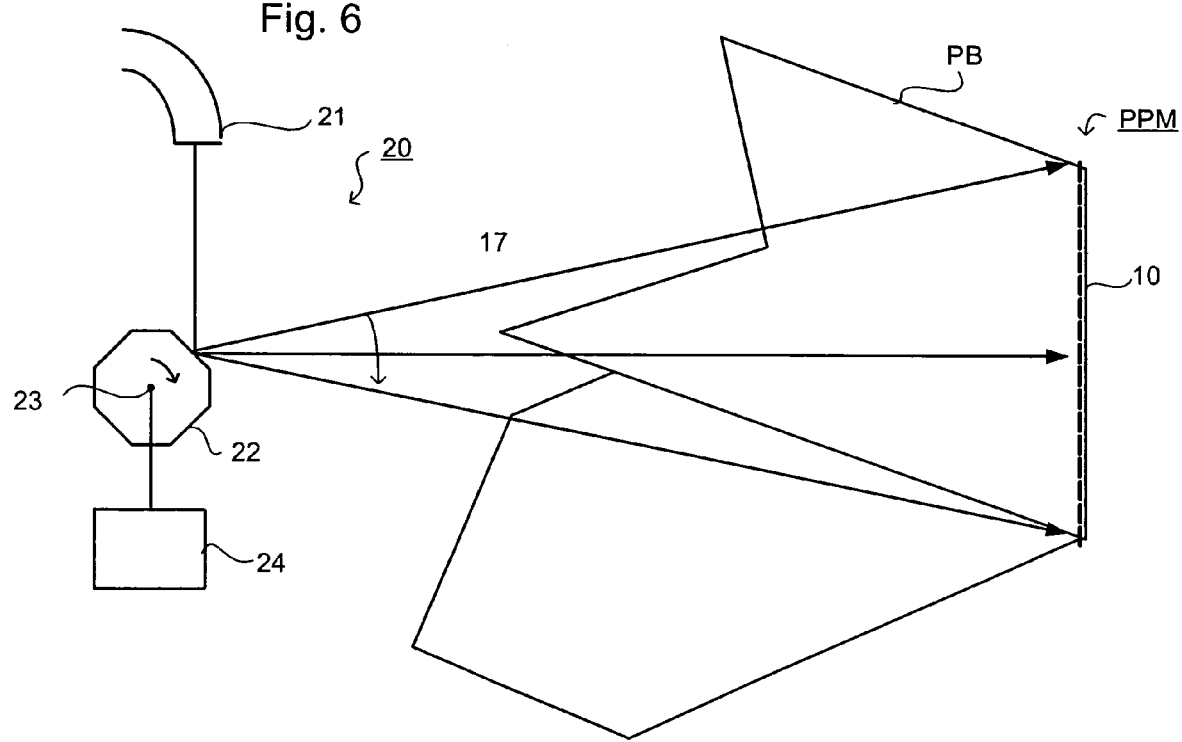
FIGS. 6 and 7 are side and plan views of a spatial light modulator, according to one embodiment of the present invention together with a beam scanning mechanism.
Figure 7:
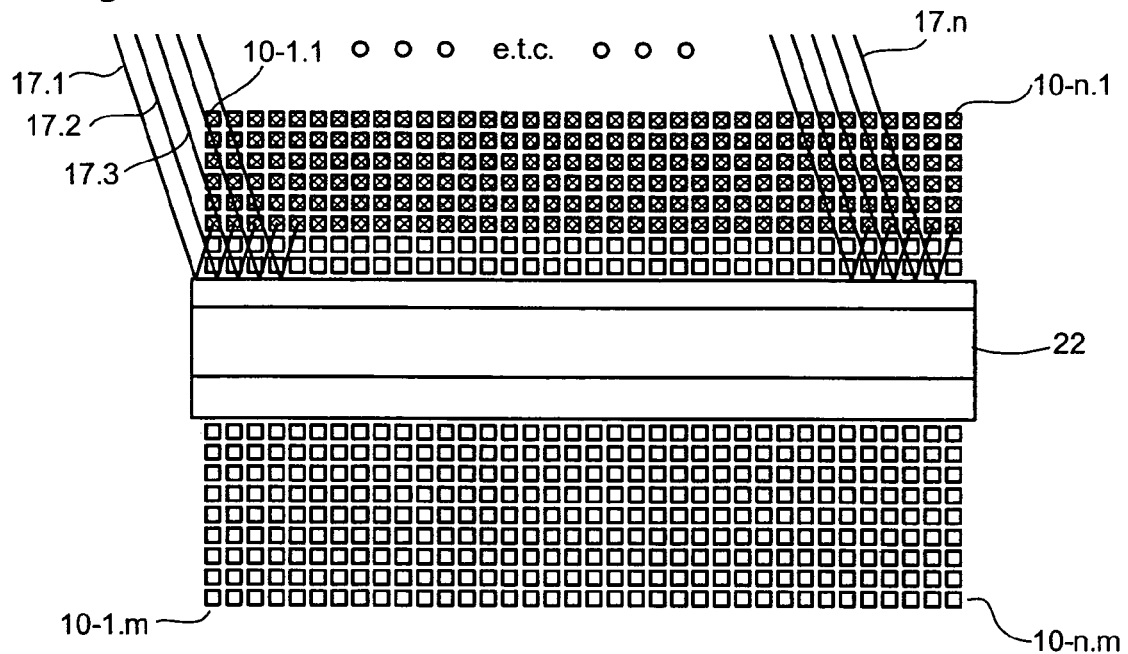

FIGS. 6 and 7 are side and plan views of a spatial light modulator, according to one embodiment of the present invention together with a beam scanning mechanism. In FIGS. 6 and 7, an optical scanning unit 20 used to scan programming beam 17 across the array of elements 10 of the spatial light modulator. A light guide 21 (e.g., an optical fiber) guides the modulated projection beam PB from its source (e.g., a laser diode) and directs it against a prismatic mirror 22. Mirror 22 is also referred to as polygon mirrors. Prismatic mirror 22 is driven to rotate about its major axis 23 by motor 24. As Prismatic mirror 22 rotates, an angle of incidence of programming beam 17 cycles as each face of prismatic mirror 22 is presented to programming beam 17. The reflected programming beam scans across elements 10 of spatial light modulator PPM, as indicated by the arrows.

In one example, a collimating lens (not shown) may be provided in an output of light guide 21, so that programming beam 17 is sufficiently well collimated that its footprint on elements 10 at edges of spatial light modulator PPM is a same as on elements 10 in a center.

Alternatively, programming beam 17 is focused on spatial light modulator PPM and a so-called fθ lens (not shown) positioned between prismatic mirror 22 and spatial light modulator PPM to compensate for a differing path length.

It is to be appreciated that although FIG. 6 shows only one programming beam 17, in practice a large number of programming beams 17 can be used. In one example, one programming beam 17 is used for each column of elements 10 in spatial light modulator PPM. This is shown in FIG. 7, which illustrates programming beams 17-1 to 17-n for respectively scanning columns 1 to n of the two-dimensional array of elements 10 10-1.1 to 10-n.m.

It will be appreciated that since n and m may each be of the order of 1,000 or 4,000, scanning a plurality of programming beams 17 across a whole column provides a significant speed advantage over using a single programming beam 17 in a raster scan pattern, and is a much simpler mechanism than would be required to provide a dedicated programming beam 17 for each element 10. Nevertheless, these alternatives may be useful in some circumstances, especially with smaller programmable patterning means PPM.

In one example, a plurality of independently controllable light sources, e.g. laser diodes, are used to provide the corresponding programming beams 17. The modulation may be a simple binary modulation if spatial light modulator PPM is a binary device or operating in a binary mode. If gray scaling is desired, the modulation may use multiple intensity levels or pulse width modulation, for example. The light sources can be arranged remotely from beam scanning unit 20 with light conducted there by optical fibers. The positioning of the light sources is not constrained by the dimensions of spatial light modulator PPM, so they can be arranged as convenient for cooling and to enable easy provision of the modulating signals. In one example, for timing purposes, the optical path lengths between the different light sources and prismatic mirror 22 should be approximately the same. Otherwise, it is necessary to individually delay the signals to the light sources electronically, e.g. by cable length.

It will be appreciated that FIG. 6 is schematic only, and beam scanning unit 2 will be of a small enough size and suitable position to not obstruct projection beam PB.

In one example, the lithographic projection apparatus operates in a pulse mode and the modulating elements 10 are set between pulses of projection beam PB. It should be noted that even if the same pattern is to be each pulse because the intensity of projection beam PB is sufficiently high that a momentum transfer on reflection and heat absorbed by modulating mirror 11 disturbs the state of modulating mirrors 11.

In one example, a phase locked loop (not shown) is used to synchronize the rotation of prismatic mirror 22 and the modulation of programming beams 17 to the trigger pulse for the radiation source. For example, an angular encoder can be used to keep track of the position of prismatic mirror 22.

In one example, as mentioned above, a simple control circuitry 18 is used to set the state of the modulating mirror 11 of a element 10 according to the charge generated in photodiode 16 by programming beam 17.

Figure 8:
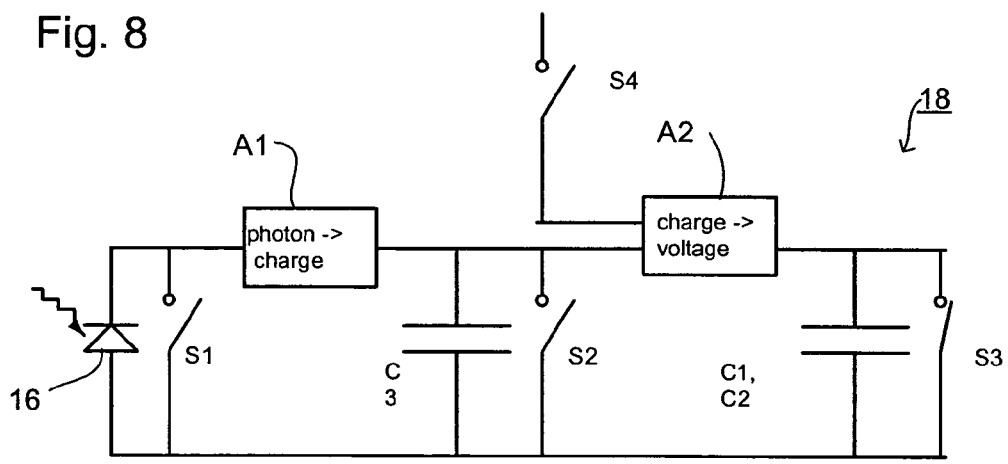
FIGS. 8 to 10 are diagrams of the control circuit of the spatial light modulator, according to one embodiment of the present invention in various phases of its cycle.
Figure 9:
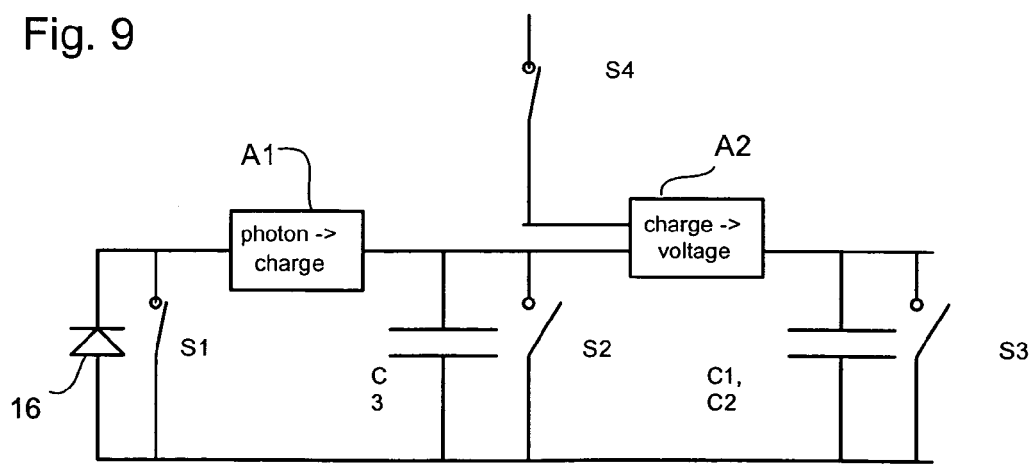
Figure 10:
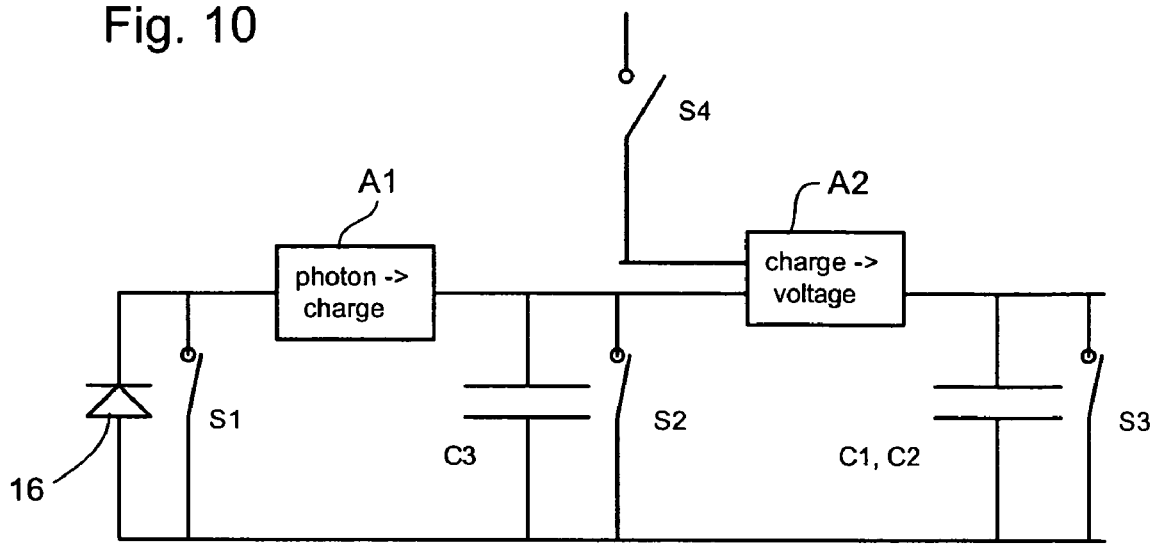

FIGS. 8 to 10 are diagrams of the control circuit of the spatial light modulator, according to one embodiment of the present invention in various phases of its cycle.

One example of this schematic circuit is shown in FIGS. 8 to 10, which respectively show the receiving, mirror-setting, and resetting phases of the cycle carried out by control circuitry 18.

In the receiving phase (FIG. 8), switches S1, S2 and S4 are open so that the current generated in photodiode 16 by programming beam 17 is amplified by amplifier A1 and stored on storage capacitor C3. Switch S3 is closed to short-circuit and discharge control capacitors C1, C2, which are formed by capacitor plates 14, 15 and the corresponding electrodes on mirror 11.

Once programming beams 17 have scanned all of elements 10 of spatial light modulator PPM, the charge stored in storage capacitor C3 of each element 10 is transferred to control capacitors C1, C2. To do this, as shown in FIG. 9, switch S3 is opened to remove a short-circuit and switch S4 is closed to power amplifier A2. Control capacitors C1, C2 are then charged according to the charge in storage capacitor C3, which in turn was determined by the amount of energy delivered by programming beam 17. Mirror 11 then moves to the appropriate state or position.

In one example, although not shown in FIGS. 8-10, an analog inverter or voltage mirror is used to ensure that one of capacitors C1, C2 is charged to an opposite polarities. Switch S1 can close during this phase to prevent interference from noise generated in photodiode 16.

After the pulse of projection beam PB, element 10 is reset by closing switch S3 to discharge control capacitors C1, C2, so that mirror 11 returns to the rest position, and switch S2 is closed discharge storage capacitor C3. Switches S1 and S2 are then opened ready for the next cycle.

Because all of the control circuits 18 are cycled substantially simultaneously, the same control signals are distributed to switches S1 to S4 in all of elements 10 at once. This can be done with a very simple wiring arrangement compared to the complexities required for separate addressing of each element 10. Also, only power rails and four control lines need be provided to the spatial light modulator.

The above arrangement deflects the mirrors from their rest position in only one direction. Where deflection in two directions is required, an analog subtractor or comparator can be included with only a minor increase in complexity, or an additional signal inverter can be used to reverse the polarities.

CONCLUSION

While specific embodiments of the invention have been described above, it will be appreciated that the invention may be practiced otherwise than as described. For example, the pixels of the spatial light modulator may be programmed from behind if the substrate on which they are disposed is made of a material, e.g. silicon, which is sufficiently transparent to the programming beam, e.g. infra-red. Programming from the backside provides greater freedom to design the beam scanning unit and makes it easier to position and align the prismatic mirror. Also, by using double-sided fabrication techniques and conductors through the thickness of the substrate, the light sensitive element can be positioned on the rear surface of the substrate. This enables the light sensitive element to be made larger, allowing use of a programming beam of lower power. Also, there is greater flexibility in choosing the wavelength of the programming beam since it is no longer constrained by the transparency of the substrate. The description is not intended to limit the invention.

What is claimed is:

1. A spatial light modulator comprising an array of pixels disposed on a support, each pixel comprising:
    a movable optical device configured to reflect substantially all radiation of a first wavelength and to transmit substantially all radiation of a second wavelength;
    a light sensitive element configured to receive a programming beam, the programming beam having the second wavelength, and to generate signal according to the programming beam; and
    a controller configured to receive the signal and to move the optical device according to the signal.

2. The spatial light modulator of claim 1, wherein said movable optical device and said light sensitive element are disposed on a same side of said support.

3. The spatial light modulator of claim 2, wherein said light sensitive element is disposed between said movable optical device and said support and said light sensitive element is substantially transparent to radiation of said second wavelength.

4. The spatial light modulator of claim 2, wherein said support is substantially transparent to radiation of said second wavelength.

5. The spatial light modulator of claim 1, wherein said moveable optical device and said light sensitive element are disposed on opposite sides of said support.

6. The spatial light modulator of claim 1, further comprising:
    a beam scanner configured to scan at least one programming beam across said array of pixels, wherein the at least one programming beam includes the programming beam.

7. The spatial light modulator of claim 1, wherein:
    said array of pixels is a two dimensional array having a plurality of rows and a plurality of columns;
    the spatial light modulator further comprises a beam scanner configured to scan a plurality of programming beams equal in number to said plurality of columns along respective ones of said columns, the plurality of programming beams including the programming beam.

8. The spatial light modulator of claim 1, wherein:
    said light sensitive element comprises a photodiode; and
    said controller comprises an actuator, the actuator including a capacitor connected to said photodiode, so as to be charged by current generated in said photodiode by said programming beam when incident thereon.

9. The spatial light modulator of claim 8, wherein said controller further comprises:
    an amplifier for amplifying the current generated in said photodiode.

10. The spatial light modulator of claim 1, wherein the movable optical device is pivotable about an axle, such that pivoting in a first direction corresponds to a first position, and pivoting in a second direction corresponds to a second position.

11. The spatial light modulator of claim 1, wherein a content of the signal is at least partially determined by a duration of the programming beam.

12. The spatial light modulator of claim 1, wherein the optical device is configured such that the programming beam passes through the optical device before being received by the light sensitive element.

13. The spatial light modulator of claim 1, wherein the optical device stays substantially planar throughout the movement.

14. The spatial light modulator of claim 1, wherein the movable optical device is configured to pattern substantially all radiation of the first wavelength.

15. A method of spatially modulating a radiation beam according to a pattern using a spatial light modulator comprising an array of pixels disposed on a support, comprising:
    modulating at least one programming beam according to the pattern, the at least one programming beam being of a first wavelength;
    scanning the at least one programming beam across the array of pixels, to irradiate a light sensitive element of each pixel in the array of pixels, the light sensitive elements being configured to generate a signal in response to the at least one programming beam;
    moving at least one optical device in each array of pixels from a respective first position to a respective second position according to the signal, each of the at least one optical device transmits substantially all radiation of the first wavelength and reflects substantially all radiation of a second wavelength; and
    directing the radiation beam onto the spatial light modulator the radiation beam being the second wavelength, and each of the at least one optical device reflecting a respective portion of the radiation beam.

16. The method according to claim 15, further comprising:
    pulsing the radiation beam and performing the modulating and the scanning between pulses of the radiation beam.

17. The method of claim 15, wherein the scanning comprises pivoting the movable optical device about an axle.

18. The method of claim 15, wherein a content of the signal is at least partially determined by a duration of the programming beam.

19. The method of claim 15, wherein the optical device is configured such that the programming beam passes through the optical device before being received by the light sensitive element.

20. The lithographic projection apparatus of claim 15, wherein the optical device stays substantially planar throughout the movement.

21. A lithographic projection apparatus, comprising:
    an illumination system configured to provide beam of radiation;

a programmable patterning device including a spatial light modulator having an array of pixels disposed on a support, the programming patterning device configured to pattern beam; and a projection system configured to project the patterned beam onto a target portion of a support, wherein each pixel comprises:

a movable optical device configured to reflect substantially all radiation of a first wavelength and to pass substantially all radiation of a second wavelength;

a light sensitive element configured to receive a programming beam, the programming beam having the second wavelength, and to generate signal according to the programming beam; and a controller configured to receive the signal and to move the moveable optical device according to the signal.

22. The lithographic projection apparatus of claim 21, wherein said movable optical device and said light sensitive element are disposed on a same side of said support.

23. The spatial light modulator of claim 22, wherein said light sensitive element is disposed between said movable optical device and said support and said light sensitive element is substantially transparent to radiation of said second wavelength.

24. The spatial light modulator of claim 22, wherein said support is substantially transparent to radiation of said second wavelength.

25. The lithographic projection apparatus of claim 21, wherein said moveable optical device and said light sensitive element are disposed on opposite sides of said support.

26. The lithographic projection apparatus of claim 21, further comprising:

a beam scanner configured to scan at least one programming beam across said array of pixels, wherein the at least one programming beam includes the programming beam.

27. The lithographic projection apparatus of claim 21, wherein:

said array of pixels is a two dimensional array having a plurality of rows and a plurality of columns;

the lithographic projection apparatus further comprises a beam scanner configured to scan a plurality of programming beams equal in number to said plurality of columns along respective ones of said columns, wherein the plurality of programming beams includes the programming beam.

28. The lithographic projection apparatus of claim 21, wherein:

said light sensitive element comprises a photodiode; and said controller comprises an actuator, the actuator including a capacitor connected to said photodiode, so as to be charged by current generated in said photodiode by said programming beam when incident thereon.

29. The lithographic projection apparatus of claim 28, wherein said controller further comprises:

an amplifier for amplifying the current generated in said photodiode.

30. The lithographic apparatus of claim 21, wherein the movable optical device is pivotable about an axle, such that pivoting in a first direction corresponds to a first position, and pivoting in a second direction corresponds to a second position.

31. The lithographic projection apparatus of claim 21, wherein a content of the signal is at least partially determined by a duration of the programming beam.

32. The lithographic projection apparatus of claim 21, wherein the optical device is configured such that the programming beam passes through the optical device before being received by the light sensitive element.

33. The lithographic projection apparatus of claim 21, wherein the optical device stays substantially planar throughout the movement.

34. A spatial light modulator comprising an array of pixels disposed on a support, each pixel comprising:

a movable mirror that is movable between at least two positions in which an incident radiation beam of a first wavelength is reflected into, respectively, different return paths;

an actuator arranged to move said movable mirror between the at least two positions, wherein the movable mirror remains substantially planar during movement;

a light sensitive element configured to receive a programming beam of a second wavelength and to generate a control signal in response thereto;

a controller configured to control said actuator to set said movable mirror to a selected position according to the control signal generated by said light sensitive element; and a beam scanner comprising:

a prism having reflective surfaces and disposed with its axis perpendicular to said columns; and a device configured to rotate said prism about said axis.

35. A spatial light modulator comprising an array of pixels disposed on a support, each pixel comprising:

a movable mirror that is movable between at least two positions in which an incident radiation beam of a first wavelength is reflected into, respectively, different return paths;

an actuator arranged to move said movable mirror between the at least two positions, wherein the movable mirror remains substantially planar during movement;

a light sensitive element configured to receive a programming beam of a second wavelength and to generate a control signal in response thereto;

a controller configured to control said actuator to set said movable mirror to a selected position according to the control signal generated by said light sensitive element; and a beam scanner configured to scan a plurality of programming beams across said array of pixels, wherein said beam scanner comprises a plurality of independently controllable light sources corresponding in number to said plurality of beams.

36. A lithographic projection apparatus, comprising:

an illumination system configured to provide a projection beam of radiation;

a programmable patterning device including a spatial light modulator having an array of pixels disposed on a support, the programming patterning device configured to pattern the projection beam;

a beam scanner, comprising:

a prism having reflective surfaces and disposed with its axis perpendicular to said columns; and a device configured to rotate said prism about said axis;

a projection system for projecting the patterned beam onto a target portion of a support, wherein each pixel comprises:

a movable mirror that is movable between at least two positions in which an incident radiation beam of a first wavelength is reflected into, respectively, different return paths;

an actuator arranged to move said movable mirror between the at least two positions, wherein the movable mirror remains substantially planar during movement;

a light sensitive element configured to receive a programming beam of a second wavelength and to generate a control signal in response thereto; and a controller configured to control said actuator to set said movable mirror to a selected position according to the control signal generated by said light sensitive element.

37. A lithographic projection apparatus, comprising:

an illumination system configured to provide a projection beam of radiation;

a programmable patterning device including a spatial light modulator having an array of pixels disposed on a support, the programming patterning device configured to pattern the projection beam;

a beam scanner configured to scan a plurality of programming beams across said array of pixels, wherein said beam scanner comprises a plurality of independently controllable light sources corresponding in number to said plurality of beams; and a projection system configured to project the patterned beam onto a target portion of a support, wherein each pixel comprises:

a movable mirror that is movable between at least two positions in which an incident radiation beam of a first wavelength is reflected into, respectively, different return paths;

an actuator arranged to move said movable mirror between the at least two positions, wherein the movable mirror remains substantially planar during movement;

a light sensitive element configured to receive a programming beam of a second wavelength and to generate a control signal in response thereto; and a controller configured to control said actuator to set said movable mirror to a selected position according to the control signal generated by said light sensitive element.

* * * * *